United States Patent Office 3,131,222
Patented Apr. 28, 1964

3,131,222
TRIALKANOLAMINE DERIVATIVES
George M. Omietanski, Tonawanda, N.Y., assignor to The Ohio State University Research Foundation, Columbus, Ohio
No Drawing. Filed June 24, 1958, Ser. No. 744,085
5 Claims. (Cl. 260—584)

This invention relates to quaternary nitrogenous salts. In one specific aspect, it relates to quaternized derivatives of substituted hydrazines. In still another aspect, it relates to novel tris(oxyalkyl)- and poly(oxyalkyl)hydrazinium salts and their metaloid derivatives.

Heretofore, quaternary hydrazinium salts have been obtained only on a laboratory scale. They have been prepared by the reaction of unsymmetrical dialkylhydrazines with alkylating agents, frequently lower alkyl halides. Because of the difficulties involved in preparing the parent hydrazines, the uses of hydrazinium compounds have not yet been completely exploited. The present invention relates to a new class of heretofore unavailable hydrazinium compounds prepared by new synthetic methods capable of adaption to commercial production. This application is a continuation-in-part of my co-pending application Serial No. 582,657, filed May 4, 1956 and now abandoned which in turn is a continuation-in-part of my application Serial No. 544,091, filed October 31, 1955 and now abandoned.

It is, therefore, an object of the present invention to provide a new generic class of tris(oxyalkyl)- and poly-(oxyalkyl)hydrazinium compounds and their metaloid derivatives which, because of their unique structure and properties are useful intermediates for the synthesis of surfactant hydrazinium esters and the preparation of polymers which will not build-up electrostatic charges. These compounds, especially the borate and titanate esters, are useful as cross-linking or curing agents for certain classes of polymers, the most important of which are the epoxy resins.

In accordance with the present invention I have made available a new generic class of useful hydrazinium compounds which may be represented as having the general formula:

$$\left[ H_2N-N \begin{matrix} (C_nH_{2n}O)_x \\ -(C_nH_{2n}O)_y-M \\ (C_nH_{2n}O)_z \end{matrix} \right] mA$$

In the above formula M may be $H_3$, B or H,

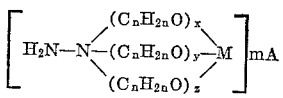

When M is B or the aforementioned Ti containing substituent, $x$, $y$ and $z$ are integers having the value of 1. When M is $H_3$, $x$, $y$ and $z$ are integers having all values between 1 and 20. Depending on the values of $x$, $y$ and $z$, $(C_nH_{2n}O)_x$, $C_nH_{2n}O)_y$ and $(C_nH_{2n}O)_z$ are alkoxy or polyalkoxy groups wherein $n$ is 2 or 3. The anion A is chloride or sulfate and $m$ represents the number of anions required to balance the charge on the cation thus maintaining electrical neutrality of the salt. To express it in another fashion, the compounds of this invention comprise 1,1,1-tris-(2-hydroxyethyl)- and (2-hydroxypropyl)- hydrazinium chloride and sulfate, their boron and titanium chelates and their ethylene and propylene oxide condensates respectively.

My invention may be better described as compounds corresponding to the following general formulae:

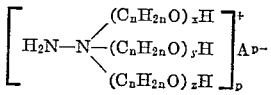

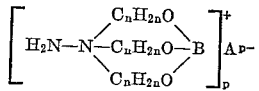

and

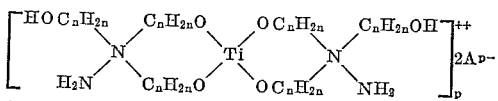

In the above formulae $x$, $y$ and $z$ are integers having the values of 1 to 20; $(C_nH_{2n}O)_x$, $(C_nH_{2n}O)_y$ and $(C_nH_{2n}O)_z$ represent alkoxy and poly alkoxy groups with $n$ being 2 or 3. The charge on the anion A (chloride or sulfate) is $p$ which also represents the number of cations required to maintain the electric neutrality of the salt.

The specific trialkanolamine derivatives of my invention can be prepared by several general methods and this discussion is not meant to be all inclusive. The preferred approach used here was the reaction of chloramine with suitable tertiary amines in accordance with the recent discovery that their reaction leads to the formation of 1,1,1-trisubstituted hydrazinium chlorides. Chloramine is readily available from the vapor phase reaction of chlorine and excess ammonia according to the process of Sisler et al., described in U.S. Patent No. 2,710,248. By treating that particular class of tertiary amines having a structure which is embraced by the general formula supra with chloramine, I am able to prepare the chloride salts of my novel hydrazinium compounds. In making the chloride compounds of the present invention, it is usually desirable to contact chloramine with a solution of the selected tertiary amine, allow the reaction to proceed until the desired quantity of chloramine is consumed and then isolate and purify the resultant hydrazinimum chloride by standard laboratory techniques. An excess of tertiary amine may be used in lieu of the inert solvent. While chloramine is most advantageously prepared in the form of a gaseous chloramine-ammonia stream obtained from a generator constructed according to the teachings of Sisler et al., other methods are equally adaptable for the purposes of the present invention. For instance, chloramine can be made by reacting chlorine with an excess of ammonia in a halogenated hydrocarbon solvent under controlled conditions of mixing at low temperatures. Such a procedure is fully described in U.S. Patent No. 2,678,258 to John F. Haller. Another effective procedure is that of Coleman et al., described in detail in Inorganic Syntheses, vol. I, 59 (1939). Alternately the chloride compounds of the present invention can be made directly by the procedure described in the co-pending application of Bernard Rudner, Serial No. 605,230, filed August 20, 1956, now abandoned, which teaches the reaction of chlorine, ammonia and the tertiary amine in the presence of excess ammonia. For simplicity, when both the amine and the product are soluble in the same inert solvent, the Rudner method has been found to be a preferred technique.

As disclosed in my co-pending application Serial No. 696,949, filed November 18, 1957, now abandoned, hydroxylamine-o-sulfonic acid reacts with tertiary amines to form 1,1,1-trisubstituted hydrazinimum sulfates. That approach has been utilized to prepare the novel sulfate salts of this invention. Preferably the appropriate tertiary amine and hydroxylamine-o-sulfonic acid are allowed to react or are heated together in the presence of an alcoholic solvent but excess amine or other suitable solvents may be used. Even though the use of solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinimum sulfate which is essentially neutral and stable to the action of base. Further purification is effected by standard laboratory techniques. Because of the multiplicity of ether and hydroxyl groups present in the molecule, the compounds of my invention, especially the sulfate salts, are quite often extremely hygroscopic and require careful drying in vacuo.

Amines suitable for the practice of my invention can be considered as and are in fact derivatives of ammonia. Treatment of ammonia with ethylene oxide gives triethanolamine; further reaction with ethylene oxide gives mixtures of higher oxyalkylated products. Propylene oxide and ammonia react in a similar fashion to give triisopropanolamine, etc. Customarily, oxyalkylation is done to a fixed epoxide-amine molar ratio. But oxiranes are so highly reactive and the reaction cannot be controlled to give the desired product exclusively. What actually results is a complex mixture of the moiety 1,1,1-tris-(2-hydroxypolyalkoxyalkyl)amine containing the average number of moles of alkylene oxide per mole of amine (ammonia). Such mixtures are not commercially resolvable but are sold on the basis of the number of moles of alkylene oxide absorbed. The terminal hydroxyl groups of my novel compounds are reactive and can enter into conventional polymer formulations. Resins based on long chain oxyalkylated constituents are desirable in the art because of cheapness of cost, resistance to hydrolysis of the ether group and flexibility of the resin because of internal plasticization by the long chains present. As is well known, synthetic textiles, fibers, etc. normally have a great tendency to develop undesirable electrostatic charges. Because of the positive charge on the hydrazinium group, polymers containing my novel compounds will not have the usual tendency to develop static electrical charges.

Triethanolamine and triisopropanolamine form borate esters of the type $N[—CH_2CH(CH_3)O—]_3B$ which undergo reaction with chloramine and hydroxylamine-o-sulfonic acid to give the corresponding hydrazinium chloride and sulfate respectively. Triethanolamine titanate and triisopropanolamine titanate behave in a similar manner. In addition, the hydrazinium spirotitanates may be prepared by the reaction of titanium tetrachloride with 1,1,1-tris-(2-hydroxyethyl)- or 1,1,1-tris-(2-hydroxypropyl)hydrazinium chloride. My novel titanium and boron metaloid chelates, like the other compounds of my invention, are useful in polymer technology. Their special merit consists in their ability to cure epoxide resins at mild conditions. Combination of the hydroxy groups in a metaloid chelate catalytically activates my novel compounds for reaction with epoxide groups particularly as well as with other condensation-capable groups.

The scope and utility of my invention is further illustrated by the following examples:

Example I

By the process described in U.S. Patent No. 2,710,248 of Sisler et al., chloramine (or monochloramine) is prepared by the vapor phase reaction of chlorine and ammonia. A generator was constructed to prepare gaseous mixtures of chloramine, ammonia and nitrogen using this process.

Such a gaseous chloramine-ammonia-nitrogen mixture was bubbled into a solution of 20 ml. (21.8 g.) of commercial triethanolamine in 50 ml. of xylene for 68 minutes. Use of a cold water bath was necessary to hold the reaction temperature below 45° C. Chloramine uptake was rapid and approximately 90% complete; all of the chloramine in the reaction flask was consumed within five minutes after the gas flow had been stopped. The white oil that precipitated during the reaction was separated by decantation, washed with hexane and carbon tetrachloride and then dried in a vacuum desiccator. Heating with limited quantities of isopropyl alcohol gradually converted the oil to crystalline 1,1,1-tris-(2-hydroxyethyl)hydrazinium chloride, M.P. 178–180° C.

The product was an extremely hygroscopic solid very soluble in water and ethyl alcohol and appreciably soluble in isopropyl alcohol but insoluble in hydrocarbon solvents. Aqueous solutions, when made alkaline, functioned as strong reducing media. Because of the reactivity of the terminal hydroxyl groups, acyl derivatives were readily formed.

Example II

The gaseous chloramine mixture of Example I was passed into a solution of 200 g. of triethanolamine in 1000 ml. of chloroform. The gel-like product contained ammonium chloride and unreacted amine. Purification was accomplished by evaporating the entire reaction mixture to dryness, washing with ether, evaporating the residue after the addition of 50 ml. of 10% aqueous sodium carbonate and further washing with ether. The product was extracted by means of hot absolute alcohol. Evaporation of the solvent and drying in vacuo gave 220 g. of 1,1,1-tris-(2-hydroxyethyl)hydrazinium chloride as a pale yellow oil containing 16.6% chloride. Even though relatively pure, the product could not be made to crystallize. It was observed that once the crystalline product of Example I was exposed to moisture, it was converted to the same non-crystallizable viscous oil.

Example III

Equimolar amounts of hydroxylamine-o-sulfonic acid (5.65 g.), triethanolamine (8 g.) and sodium hydroxide (2 g.) were allowed to react by adding the acid dissolved in methyl alcohol to a solution of the base and triethanolamine in the same solvent. After the vigorous exothermic reaction had subsided, sodium sulfate precipitated from the cooling reaction mixture and was separated by filtration. Pouring the reaction mixture into an excess of chloroform resulted in the precipitation of crude 1,1,1-tris-(2-hydroxyethyl)hydrazinium sulfate as an oil. The product was treated with sodium carbonate, dried and extracted with ethyl alcohol. Pouring the extract into excess chloroform gave the product as a pale yellow hygroscopic oil.

Example IV

The addition of 5.65 g. of hydroxylamine-o-sulfonic acid to 20 g. of triethanolamine without solvent generated much heat and resulted in a gummy precipitate of product and triethanolamine sulfate. The reaction mixture was worked up as in the previous example and with the same results.

Example V

"Still bottoms," the residue resulting from the manufacture and distillation of triethanolamine, is a dark viscous liquid mixture consisting mainly of $N(C_2H_4O)_xH_3$ where according to the method of manufacture, X is usually less than 4 and averages from 1.5 to 3.5. Fifty g. of "Still bottoms" in 250 ml. of chloroform was treated with excess chloramine using the generator of Example I. The reaction mixture was filtered from ammonium chloride and the filtrate combined with isopropyl alcohol washings of the filter cake was evaporated free of solvent. The resultant thick dark oil was extracted with ether, made alkaline to phenolphthalein with 10% aqueous sodium carbonate, evaporated to dryness, rewashed with ether, taken up in isopropyl alcohol and poured into excess dioxane to yield a thick brown oil largely 1,1,1-tris-(2-hydroxypolyethoxyethyl)hydrazinium chloride. The product was purified by treatment of its aqueous solution with charcoal, filtration, evaporation of the water, solution in isopropyl alcohol and reprecipitation by addition to excess dioxane.

Example VI

A commercially available trialkanol amine is made by reacting triethanolamine with ethylene oxide until 20 moles of the oxirane was absorbed per mole of amine.

A mixture results having the general formula

N(C₂H₄O)ₓH(C₂H₄O)ᵧH(C₂H₄O)_zH in any batch the sums of $x$, $y$ and $z$ average 23 but may have values as low as 4 and as high as 50. A solution of 200 g. of the above oxyalkylated amine dissolved in chloroform was treated with excess chloramine by means of the aforedescribed generator. After separation of 26.5 g. of ammonium chloride, the filtrate was evaporated to a thick yellow oil which contained 6.9% unreacted amine and 3.14% ionic chloride. The product was extracted with ether till free of amine and then dried to a constant weight. There resulted 213 g. of 1,1,1-tris-(2 - hydroxypolyethoxyethyl)hydrazinium chloride as a thick pale yellow oil containing 3.5% chloride (the theoretical value for $x+y+x=23$ is 3.4%).

Example VII

The oxyalkylated amine of the previous example (51.5 g. dissolved in 50 ml. of methyl alcohol) was added to 5.6 g. of hydroxylamine-o-sulfonic acid in 20 ml. of the same solvent. After refluxing for 30 minutes, the solvent was allowed to evaporate. The resultant semi-crystalline mass was treated with aqueous sodium carbonate, evaporated to dryness, extracted with ether, taken up in methyl alcohol, filtered and evaporated to dryness in vacuo to give the hydrazinium sulfate corresponding to the hydrazinium chloride of Example VI. The product was a hygroscopic, semi-crystalline, off-white residue.

Example VIII

A solution was prepared consisting of 25 ml. of a 41% solution of triethanolamine titanate,

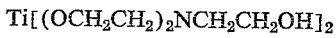

Ti[(OCH₂CH₂)₂NCH₂CH₂OH]₂ in isopropyl alcohol and 25 ml. of dimethylformamide. A chloramine-ammonia gas stream was passed into this mixture at 20–30° C. giving a strongly exothermic reaction. After all of the chloramine had been consumed, the reaction mixture was stirred into an excess of benzene. The chloramine adduct was subsequently separated and obtained in the form of an extremely viscous paste. Its laboratory analysis was consistent with its formulation as the novel 1,1-bis-(2-hydroxyethyl)-1,1,1', 1'-[spirotitan-bis-(2-oxyethyl)]dihydrazinium dichloride.

Example IX

Excess chloramine made as previously described was bubbled into a solution of 52 g. of triethanolamine titanate in 1000 ml. of 2-propanol. There resulted a mixed gel of the hygroscopic product and ammonium chloride. Evaporation of the filtrate in vacuo yielded the crude chloramine adduct of Example VIII to which the following structural formula is ascribed:

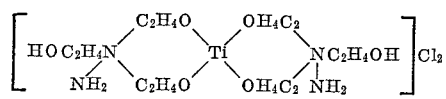

The product was very sensitive to polymerization and hydrolysis and polymerized on attempted drying in vacuo.

Example X

Chloramine as previously prepared was added to a solution of 33.7 g. of triethanolamine borate in chloroform. Filtration gave 44 g. of the combined solid product and ammonium chloride. Solution in hot isopropyl alcohol followed by the addition of ethyl acetate allowed the ammonium chloride to be removed by filtration. Evaporation of the filtrate gave the product as a semi-solid residue to which the formula

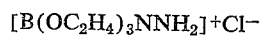

[B(OC₂H₄)₃NNH₂]⁺Cl⁻ has been ascribed.

Example XI

When 5.65 g. of hydroxylamine-o-sulfonic acid in methanol was added to a solution containing 29 g. of triethanolamine titanate, an immediate gummy precipitate resulted which slowly dissolved on heating. On cooling a glass-like, off-white solid was obtained which had an analysis consistent with its being a polymerized bis hydrazinium sulfate (percent C=26.1, percent H=5.24, percent N=7.42, percent S=8.25 and the percent ash as sulfate was 58.9%). The product was instantly hydrolyzed by water and readily polymerizable by heat.

I claim:
1. Compounds having the formula

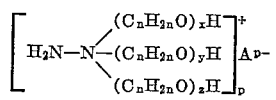

wherein $x$, $y$ and $z$ are integers having the value of 1 to 20 and whose maximum average sum is 50, $n$ is an integer having the value 2 to 3, $p$ represents the charge on A, and A is an anion selected from the group consisting of chloride and sulfate.

2. 1,1,1-tris-(2-hydroxyethyl)hydrazinium chloride.
3. 1,1,1-tris-(2-hydroxyethyl)hydrazinium sulfate.
4. 1,1,1 - tris-(2-hydroxypolyethoxyethyl)hydrazinium chloride wherein the average number of ethoxy groups is about 20.
5. 1,1,1-tris - (2 - hydroxypolyethoxyethyl)hydrazinium sulfate wherein the average number of ethoxy groups is about 20.

References Cited in the file of this patent

UNITED STATES PATENTS 2,775,604 Zech _____ Dec. 25, 1956

FOREIGN PATENTS 491,098 Canada _____ Mar. 10, 1953

OTHER REFERENCES

Audrieth et al.: "J. Am. Chem. Soc.," vol. 76, pp. 4869–71 (1954).
Gever et al.: "J. Org. Chem.," vol. 14, pp. 813–816 (1949).
Singh: "J. Chem. Soc.," vol. 103, pp. 604–13 (1913).
Singh: "J. Chem. Soc.," vol. 105, pp. 1972–87 (1914).
Omietanski et al.: "J.A.C.S.," 78 pp. 1211–13 (Mar. 20, 1956).